I. S. BEESON.
SPRING TIRE.
APPLICATION FILED DEC. 20, 1916.
1,225,210.
Patented May 8, 1917.
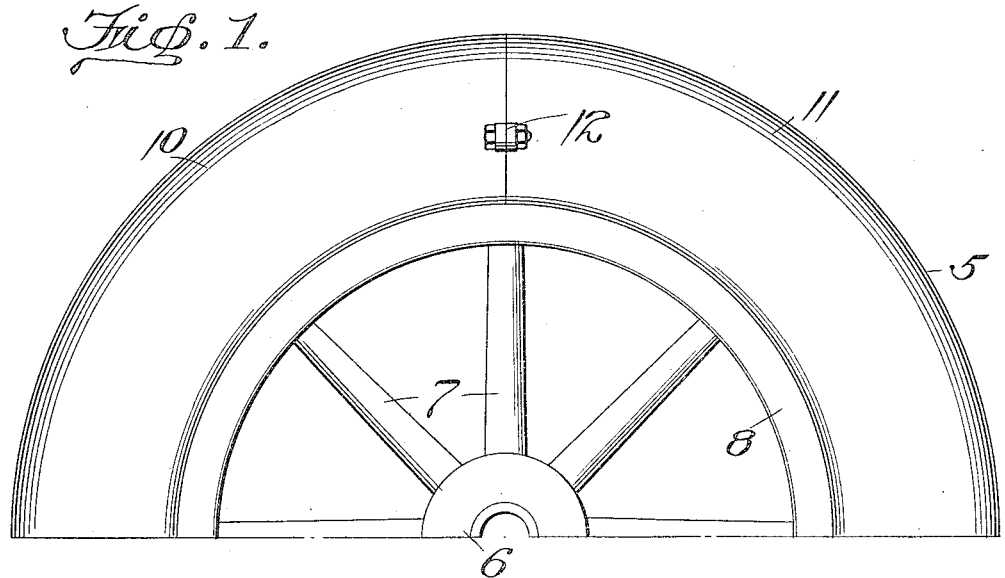
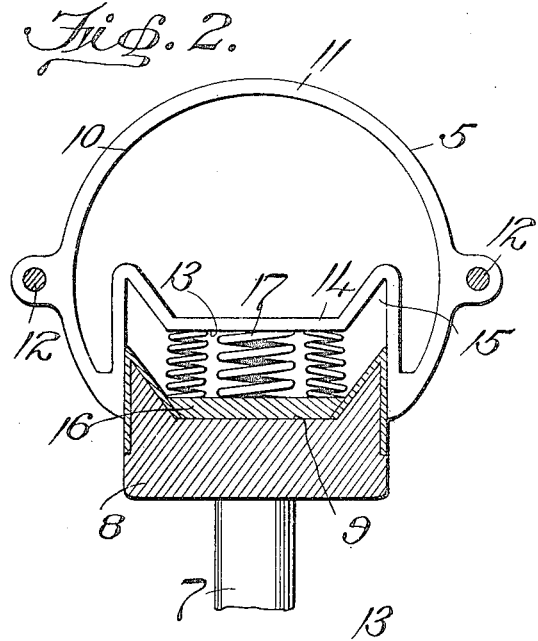
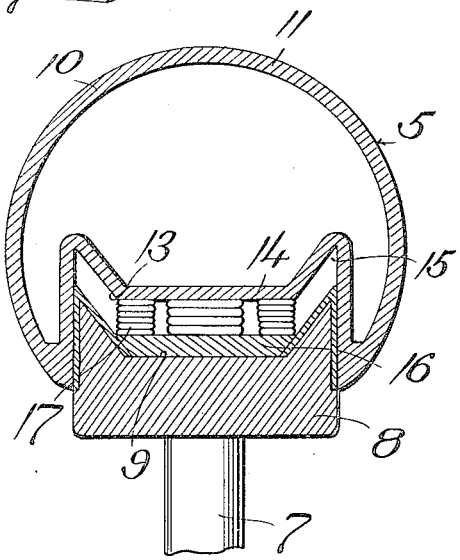
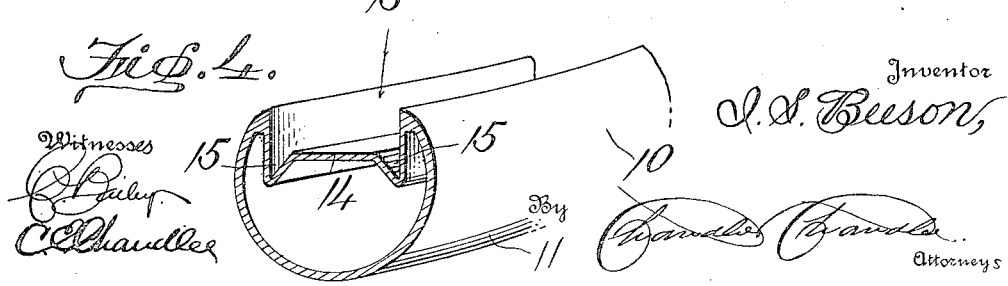

UNITED STATES PATENT OFFICE.

IRA S. BEESON, OF MONTICELLO, MISSISSIPPI, ASSIGNOR OF ONE-FOURTH TO BELLE LEE, OF MACOMB, MISSISSIPPI, AND ONE-FOURTH TO EMMA F. SMITH, OF MONTICELLO, MISSISSIPPI.

SPRING-TIRE.

1,225,210.   Specification of Letters Patent.   Patented May 8, 1917.

Application filed December 20, 1916. Serial No. 138,071.

*To all whom it may concern:*

Be it known that I, IRA S. BEESON, a citizen of the United States, residing at Monticello, in the county of Lincoln, State of Mississippi, have invented certain new and useful Improvements in Spring-Tires; and I do hereby declare the following to be a full, clear, and exact description of the invention, such as will enable others skilled in the art to which it appertains to make and use the same.

This invention relates to vehicle wheels, and is directed more particularly to a spring wheel of simple and improved construction.

An object of the present invention is to provide a spring wheel in which improved and novel means are embodied for resiliently mounting the tire upon the felly thereof.

A further object of the invention resides in the provision of a spring wheel in which the tire is bodily yieldable radially of the felly but which is positively held in novel manner against lateral displacement therefrom.

With the above and other objects of similar nature in view the invention consists in the construction, combination and arrangement of parts, set forth in and falling within the scope of the appended claim.

In the drawings:

Figure 1 is a side elevation of a wheel constructed in accordance with the invention, Fig. 2 is a transverse section therethrough, Fig. 3 is a view similar to Fig. 2 showing the tire compressed, and Fig. 4 is a fragmental perspective view of the tire removed from the felly.

Referring now more particularly to the accompanying drawing, my improved wheel is designated generally at 5 and comprises a hub, 6, spokes 7 and felly 8 all rigidly connected together in any preferred manner.

The felly 8 is provided in its periphery with a circumscribing channel 9, the side walls of which are disposed in divergent relation as shown.

The felly 8 is further provided on its sides with a suitable facing of Babbitt or other wear resisting material for a purpose to appear.

The tire is shown generally at 10 and consists of two semicircular sections 11, which when assembled, encircle the felly 8 and have their meeting ends detachably connected together as indicated at 12.

The sections 11 are preferably of hollow sheet steel construction so formed as, when assembled to present outwardly the appearance of a conventional type of pneumatic tire.

The sections 11 are however each formed in its inner periphery with a channel 13 so proportioned as to snugly yet slidably embrace the felly 8, the side walls of the channel being disposed in contact with the Babbitt facing of the felly so that no wear will occur on the latter during movement of the tire with respect thereto.

It will be noted that the web 14 of the channel 13 is of a cross section similar to that of the channel 9, and thus provides with the adjacent channel walls, recesses 15 into which the flanges of the felly are adapted to seat upon movement of the tire and felly toward each other, the tire being in this manner securely braced against any tendency toward lateral displacement.

For yieldably supporting the tire with respect to the felly 8 there is seated within the channel 9 of the latter, an annular ring 16, and suitably connected with this ring at spaced intervals in its periphery are coil springs 17, said springs bearing upon the web 14 and serving to normally hold the tire centered with respect to the felly 8.

What I claim is:

In a spring wheel the combination of a felly provided with a peripheral channel having divergent side walls, an annular ring seated within said channel, a substantially rigid tire encircling the felly and provided with an inwardly opening channel slidably embracing the sides of the felly, the web of the second named channel having a cross-section similar to that of the first named channel and being movable thereinto at times, and springs secured to said annular ring and interposed between it and the web of the second named channel.

In testimony whereof, I affix my signature, in the presence of two witnesses.

IRA S. BEESON.

Witnesses:
 W. E. DRIVER,
 E. I. FAIRMON.

Copies of this patent may be obtained for five cents each, by addressing the "Commissioner of Patents, Washington, D. C."